United States Patent
Batten

(10) Patent No.: US 12,464,488 B1
(45) Date of Patent: Nov. 4, 2025

(54) LOCAL LOCATION DETERMINATION ON PORTABLE COMMUNICATION DEVICES

(71) Applicant: Relay, Inc., Chapel Hill, NC (US)

(72) Inventor: Dayne Batten, Cary, NC (US)

(73) Assignee: Relay, Inc., Raleigh, NC (US)

( * ) Notice: Subject to any disclaimer, the term of this patent is extended or adjusted under 35 U.S.C. 154(b) by 0 days.

(21) Appl. No.: 19/247,513

(22) Filed: Jun. 24, 2025

(51) Int. Cl.
*H04W 64/00* (2009.01)

(52) U.S. Cl.
CPC .................................. *H04W 64/00* (2013.01)

(58) Field of Classification Search
CPC ..... H04W 4/02; H04W 4/029; H04W 36/302; H04W 36/36
USPC ......... 455/456.1, 456.2, 456.6, 456.5, 456.3, 455/67.11, 414.1
See application file for complete search history.

(56) References Cited

U.S. PATENT DOCUMENTS

| | | | | |
|---|---|---|---|---|
| 11,811,845 | B2* | 11/2023 | Decenzo | H04L 12/2809 |
| 12,256,021 | B1* | 3/2025 | Torres | H04L 9/3247 |
| 2009/0312036 | A1* | 12/2009 | Alizadeh-Shabdiz | H04W 64/00 455/456.1 |
| 2013/0017840 | A1* | 1/2013 | Moeglein | G01S 5/0278 455/456.1 |
| 2013/0247117 | A1* | 9/2013 | Yamada | H04W 12/06 340/12.5 |
| 2013/0336138 | A1* | 12/2013 | Venkatraman | G01S 5/0278 370/252 |
| 2017/0188188 | A1* | 6/2017 | Kang | H04W 4/30 |
| 2018/0196972 | A1* | 7/2018 | Lu | H04W 52/0274 |
| 2018/0206062 | A1* | 7/2018 | Jain | H04W 4/025 |
| 2018/0219976 | A1* | 8/2018 | Decenzo | H04L 65/612 |
| 2021/0045189 | A1* | 2/2021 | de Moura | H04W 84/005 |
| 2021/0256833 | A1* | 8/2021 | Daoura | H04W 4/021 |
| 2022/0045554 | A1* | 2/2022 | Leabman | H02J 50/40 |

* cited by examiner

*Primary Examiner* — Joseph Arevalo
(74) *Attorney, Agent, or Firm* — Gregory Stephens

(57) ABSTRACT

In an example, a method includes obtaining, at a portable communication device (PCD), an environment dataset comprising point data. Each point data has a position and respective wireless signal data at that position within a fixed environment. Wireless access point data is received from one or more wireless access points in the fixed environment and includes a unique access point identifier and received signal strength values. The PCD compares the wireless access point data and the environment dataset and determines a best match for the received wireless access point data in the environment dataset, which is identified as a location.

17 Claims, 11 Drawing Sheets

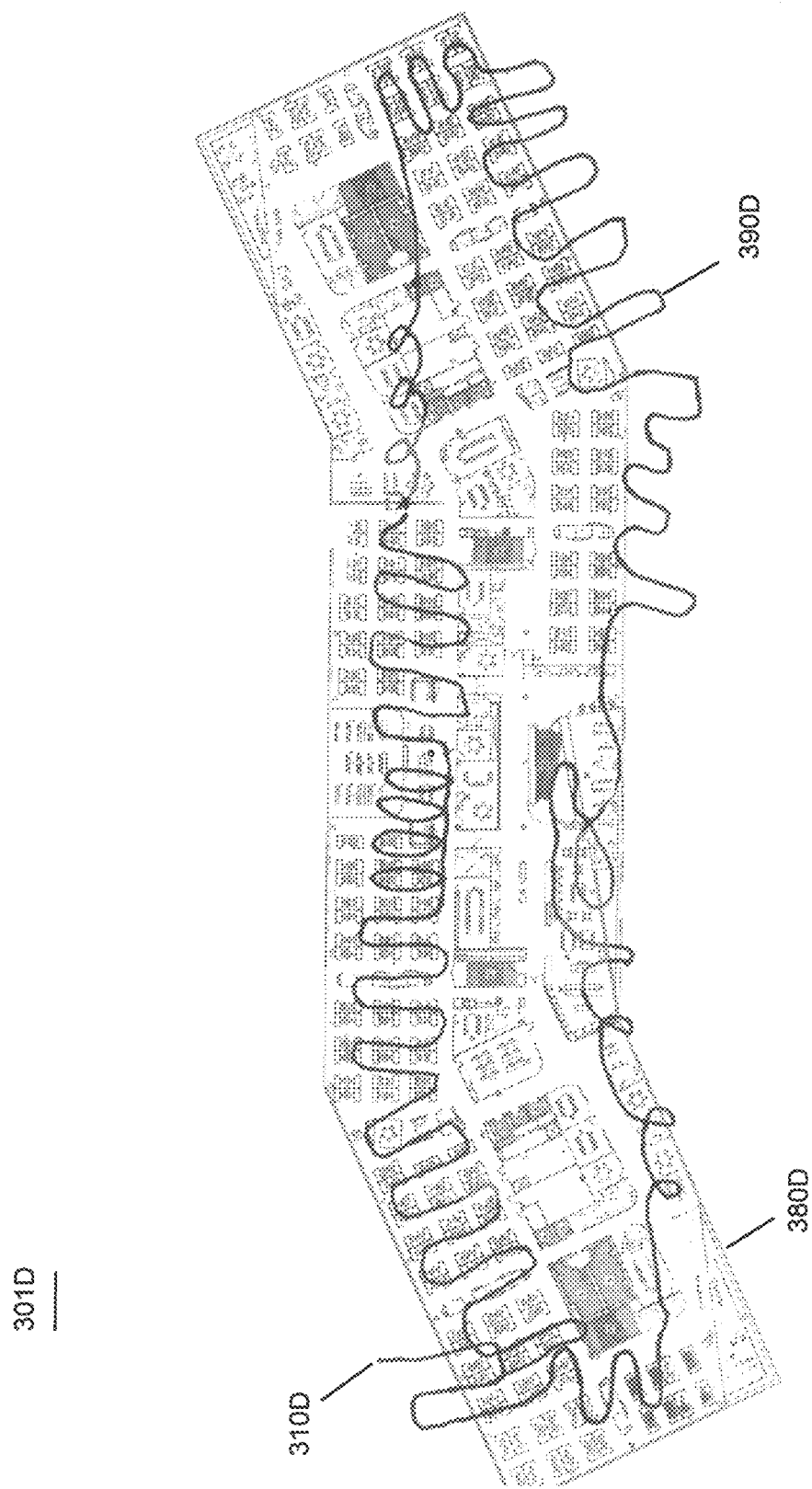

LOCAL LOCATION DETERMINATION ON PORTABLE COMMUNICATION DEVICES

BACKGROUND

1. Field

The disclosed subject matter generally pertains to location determination for portable communication devices (PCDs). Certain subject matter pertains to location determinations made in an indoor environment without access to a location beacon system.

2. Description of the Related Art

In many voice and data communication contexts, such as in an enterprise setting, it is not desirable to have users operate a smartphone, whether a personal smartphone or a company-supplied smartphone. Among considerations impacting a decision not to use a smartphone are potential distractions which may impact workplace safety and the requirement to manage access to secure data.

The Relay® device by Relay, Inc. is a handheld portable communication device (PCD) that provides voice communication with other Relay® devices, similar to a walkie-talkie. One embodiment of a Relay® device uses a voice interface while other embodiments may include a limited small screen primarily used to convey device diagnostic information such as, for instance, battery status, signal strength, channel information, time, etc. The Relay® device can use a wireless Internet Protocol (IP) communication link rather than a circuit switched communication link to exchange voice messages and data with a communication platform server (CPS). The CPS manages voice messages and data among various endpoints. The communication device(s) may wirelessly connect to an IP network over one or more wireless IP interfaces and communication links. The IP communication link may use one or more of the Wi-Fi channels and protocols, such as the 802.11 family, or may use one of the many cellular IP air interfaces and over-the-air (OTA) RF protocols.

SUMMARY

Conventional location determination, particularly for indoor environments, relies on a location beacon system, where the position of a beacon is known in advance and signals from one or more beacons are used to determine a location. When there is no location beacon system in an indoor environment, a precise location is hard to determine, often using other techniques such as triangulation from cell towers with poor received signal strength.

An embodiment provides a location determination process for mapping and precomputing a dataset for use locally by a portable communication device (PCD) in a beaconless environment, such as inside a building. A location determination dataset may be formed from a path-based scanning and data collection technique, for example facilitated by dedicated hardware such as a measuring wheel and PCD. The odometry data collected is refined in a manner to simplify the data for use in by the PCD locally, without the requirement to have a remote or cloud server provide computation resources.

In an embodiment, a method comprises obtaining, at a portable communication device (PCD), an environment dataset comprising point data, wherein each point data has a position and respective wireless signal data at that position within a fixed environment; receiving, using a wireless subsystem of the PCD, wireless access point data from one or more wireless access points in the fixed environment, wherein the wireless access point data comprises a unique access point identifier and received signal strength values; comparing, using a set of one or more processors of the PCD, the wireless access point data and the environment dataset; determining, using the set of one or more processors of the PCD, a best match for the received wireless access point data in the environment dataset based on the comparing; and identifying, using a set of one or more processors of the PCD, a location based on the best match.

Another embodiment provides a portable communication device (PCD), comprising: a set of one or more processors; and a non-transitory storage device comprising code executable by the set of one or more processors, the code comprising: code that obtains, at the PCD, an environment dataset comprising point data, wherein each point data has a position and respective wireless signal data at that position within a fixed environment; code that receives, using a wireless subsystem of the PCD, wireless access point data from one or more wireless access points in the fixed environment, wherein the wireless access point data comprises a unique access point identifier and received signal strength values; code that compares, using the set of one or more processors of the PCD, the wireless access point data and the environment dataset; code that determines, using the set of one or more processors of the PCD, a best match for the received wireless access point data in the environment dataset based on output of the code that compares; and code that identifies, using the set of one or more processors of the PCD, a location based on the best match.

A further embodiment provides a computer program product, comprising: a non-transitory computer readable storage medium having computer executable code, comprising: code that obtains, at the PCD, an environment dataset comprising point data, wherein each point data has a position and respective wireless signal data at that position within a fixed environment; code that receives, using a wireless subsystem of the PCD, wireless access point data from one or more wireless access points in the fixed environment, wherein the wireless access point data comprises a unique access point identifier and received signal strength values; code that compares, using the set of one or more processors of the PCD, the wireless access point data and the environment dataset; code that determines, using the set of one or more processors of the PCD, a best match for the received wireless access point data in the environment dataset based on output of the code that compares; and code that identifies, using the set of one or more processors of the PCD, a location based on the best match.

The foregoing is a summary and thus may contain simplifications, generalizations, and omissions of detail; consequently, those skilled in the art will appreciate that the summary is illustrative only and is not intended to be in any way limiting.

These and other features and characteristics of the example embodiments, as well as the methods of operation and functions of the related elements of structure and the combination thereof, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of a claimed invention.

BRIEF DESCRIPTION OF THE DRAWINGS

FIG. 3D illustrates an example interactive GUI.

DETAILED DESCRIPTION OF EXAMPLE EMBODIMENTS

The described features, structures, or characteristics of the example embodiments may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well known structures, materials, or operations are not shown or described in detail to avoid obfuscation.

One example of a portable communication device (PCD) is the Relay® device offered by Relay, Inc. Such devices find use in, for example, facilitating voice communication among users keeping a respective PCD on their person. In a non-limiting example, a PCD provides a push-to-talk functionality, like conventional walkie-talkies for radio communications. PCDs require sophisticated communication capabilities, including customized, secure, and/or personal logical communication channels, for example a voice channel only connecting members of a given team.

In some environments, for example inside a building, dedicated location beacon systems provide signals that are used to locate a PCD. Without location beacons, the inability to determine a precise location can be detrimental in certain circumstances, for example during an emergency.

An embodiment provides an environment dataset, stored on a PCD, that can be used to precisely locate the PCD in the environment using only computation on the PCD. An environment dataset may be based on a path-based scanning and data collection technique, for example using as a measuring wheel and PCD. First, odometry data is collected, which may include distance, orientation or direction, and the strength of wireless signals at a number of locations. The odometry data is refined to simplify the data in a manner to make it more suitable for use by the PCD. In an embodiment, the refinement may include obtaining adjustments, for example via an interactive GUI, to path data in order to create a ground truth dataset for location determination. The simplification process may include reduction of the ground truth dataset and formatting it in a manner so that the processing to determine a location on a PCD is much reduced. By reducing the resource and power required to determine an accurate location, these techniques assist greatly in power management for the PCD, which may have limited battery power, and so extending the period of use.

The description now turns to the figures. The illustrated example embodiments will be best understood by reference to the figures. The following description is intended only by way of example and simply illustrates certain example embodiments.

Figure 1:
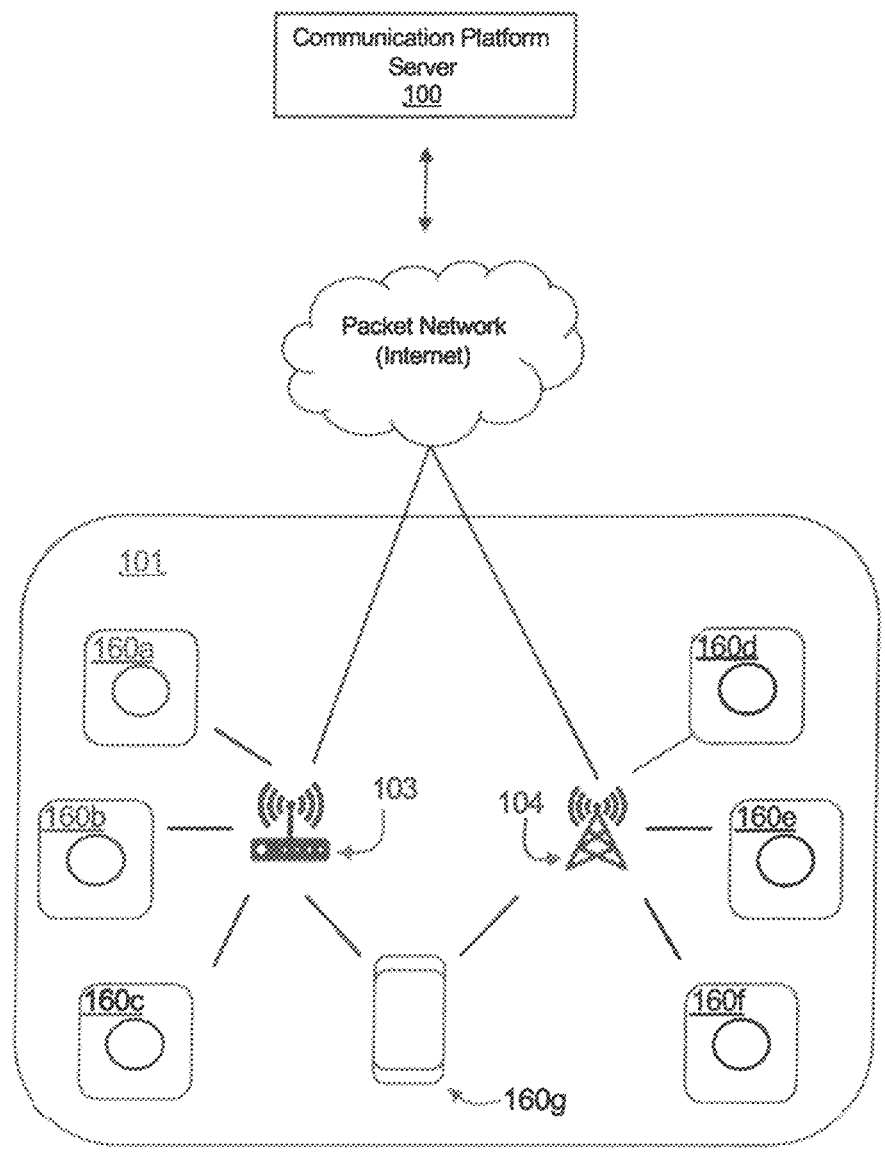
FIG. 1 illustrates a diagram of example system components according to an embodiment.

Illustrated in FIG. 1 is a system implemented in a network environment including communication platform server (CPS) 100 enabling a plurality of PCDs 160a-g to communicate with one another through message channels. Messages may be exchanged using wireless communication, with common examples including wireless push-to-talk (PTT) communication over a voice-based logical communication channel, where a logical channel is used to couple a smaller group of available PCDs. A logical communication channel is an abstraction of the physical communication channels used, such as a Wi-Fi, cellular, or Long Range (LoRa) physical communication channel. For PCDs 160a-g, messages may be managed by software running on a server such as CPS 100, for example providing a message queue, routing messages, or dynamically configuring a PCD. In addition, certain PCDs, such as PCD 160g, may be provided in a different form factor, such as a smartphone running a mobile app to provide access and functions to connect to other PCDs 160a-f, for example using PTT over cellular or Wi-Fi. In an embodiment PCDs 160a-f may be voice interface PCDs as described herein. In another embodiment, PCDs may have limited screen functionality compared to a smartphone.

In some example embodiments, PCDs 160a-g are configured to operate within an area 101. In an example functionality, communication outside area 101 may be restricted, either by design or because area 101 has limited cellular or Wi-Fi connections. Connectivity may be through private network devices in range of area 101, for example Wi-Fi access point 103 and cellular access device 104 with coverage that includes all or a portion of area 101, providing access to CPS 100 via a broader packet network such as the Internet via typical wireless carrier infrastructure. Note that the network provided may be private or public, or some combination thereof, using conventional networking solutions.

Figure 2:
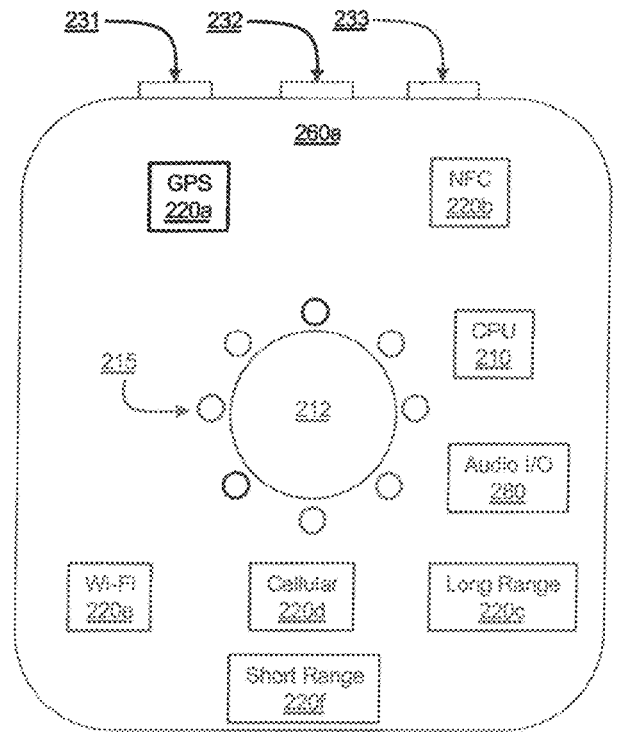
FIG. 2 illustrates an example portable communication device and components according to an embodiment.
Figure 2B:
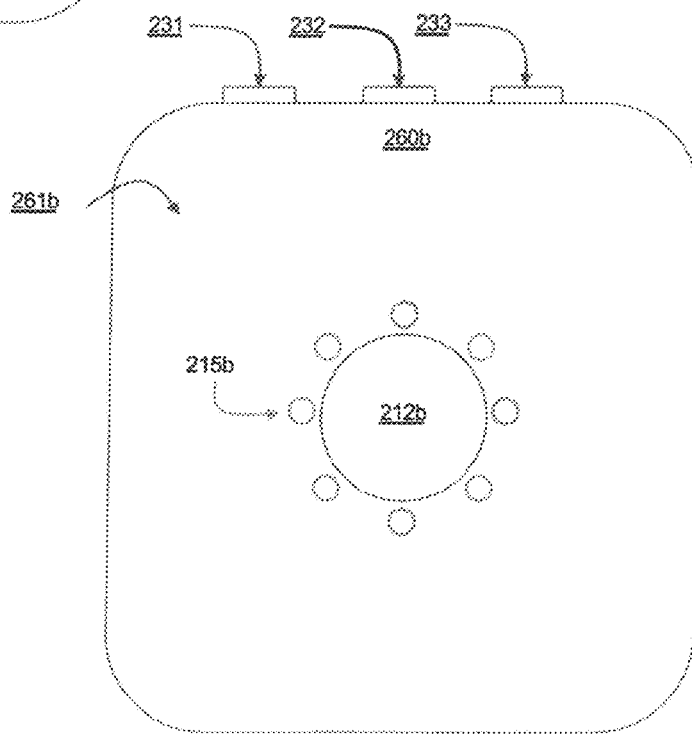
FIG. 2B illustrates an example portable communication device exterior according to an embodiment.

Referring to FIGS. 2 and 2B, in an embodiment a PCD 260a, 260b may be a voice interface PCD featuring a voice interface and limited control buttons 212, 212b such as the Relay® device. In an embodiment, PCD 260a may include one or more of several radio interfaces, including a GPS module 220a, a near field communication (NFC) device 220b, a LoRa transceiver 220c, a cellular transceiver 220d, a Wi-Fi transceiver 220e, and a short-range wireless (e.g., BLUETOOTH) transceiver 220f. Cellular transceiver 220d may comprise a radio frequency (RF) chipset configured to communicate using a plurality of wireless cellular frequency bands and protocols. Wi-Fi transceiver 220e may comprise an RF chipset configured to communicate using one or more of the 802.11 protocols commonly referred to as Wi-Fi. Short range transceiver 220f may comprise an RF chipset configured to communicate using the BLUETOOTH or other short range wireless protocol(s). Long-range transceiver 220c may comprise an RF chipset configured to communicate using yet another RF communication protocol known as LoRa. LoRa is a physical radio communication protocol ideal for peer-to-peer long range wireless applications and long battery life. Each of PCD 260a components 220a-f, 280 may be controlled by one or more CPUs 210, such as in the form of a microprocessor that communicates with the internal components using a bus (not illustrated).

The view of FIG. 2B illustrates a user's view of PCD 260b. PCD 260b includes control button 212b, which may be touched or pressed to activate a function, such as a voice interface. Indicator lights 215b, which may take the form of light emitting diodes (LEDs), may be used as an output device, for example to indicate the device state, such as powering or powered on, powering or powered off, battery level, connected/disconnected, PTT input receiver activated, message transmitted, message received, direction, etc. In the view of FIG. 2B, a surface 261b covers internal components illustrated in FIG. 2A, such as the audio I/O device 280. Surface 261b may provide openings for receiving and transmitting audio signals, for example audio input via a microphone included in audio I/O device 280 and transmitting audio output via a speaker included in audio I/O device 280.

With respect to a user interface, a control button 212, 212b and a plurality of indicator lights 215, 215b are shown. In an embodiment, the PCD 260a may include one or more physical buttons and/or rocker switches. For example, as shown in FIGS. 2 and 2B, three physical buttons 231, 232, and 233 may be present on the side of the PCD. It should be understood that FIGS. 2 and 2B are for illustrative purposes only and that other interface designs and/or setups may be utilized.

Figure 3A:
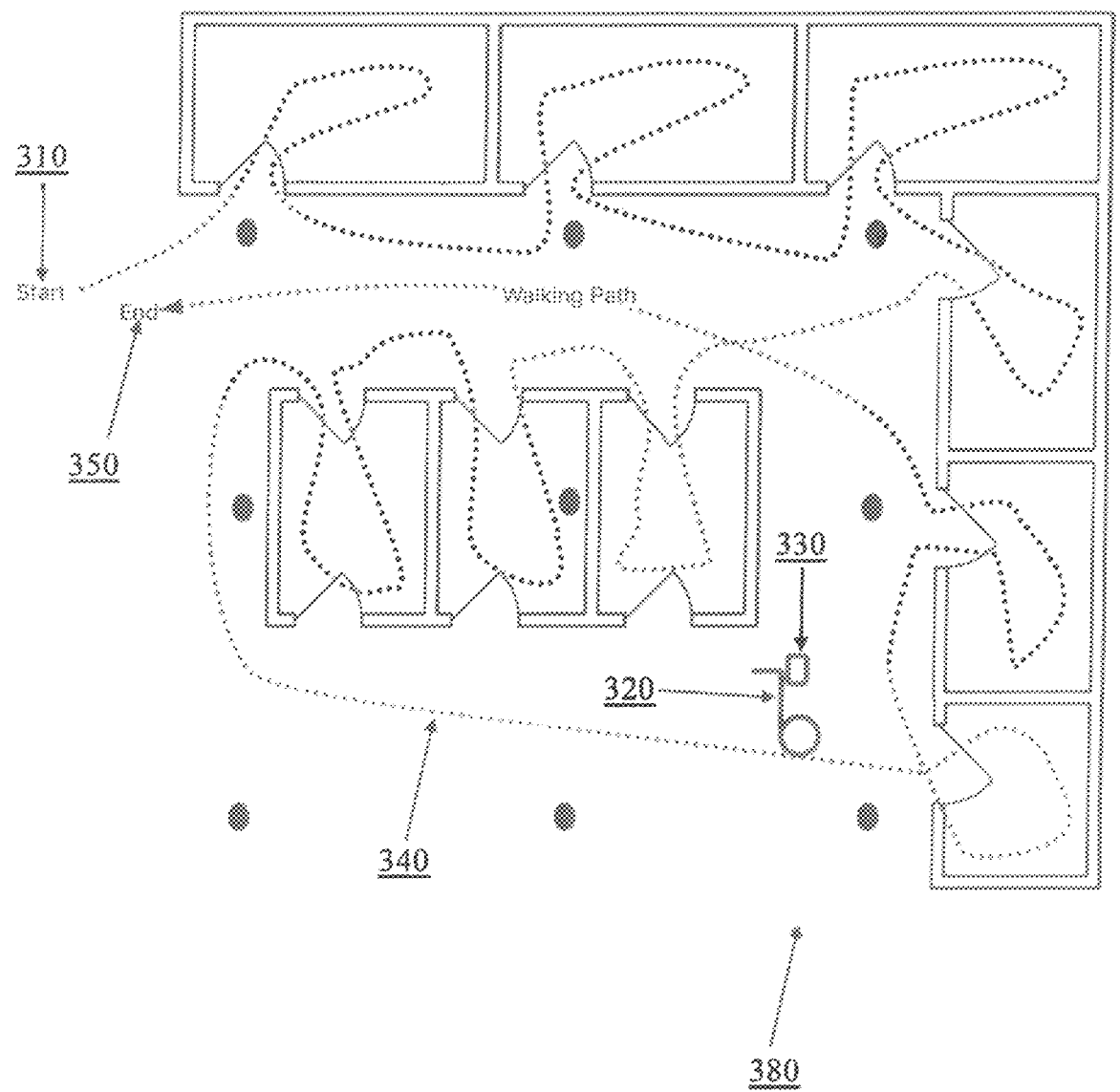
FIG. 3A illustrates an example of an indoor environment and odometry data collection according to an embodiment.

In terms of forming an environment dataset that can be used to accurately locate a PCD without requiring a location beacon system, FIG. 3A illustrates an example method of obtaining odometry data comprising distance data, directional data, and wireless signal strength data. In the example illustrated in FIG. 3A, the odometry data comprises distance collected by using a measuring wheel device, indicated at 320, and directional and wireless signal strength data collected using a PCD, e.g., a Relay X device, mounted to the measuring wheel device indicated at 330. For example, measuring wheel device 320 may indicate distance travelled as it is wheeled in an indoor environment. The distance may be reported by measuring wheel device 320 to PCD 330, using either a wired or wireless connection. Further, directional and orientation data may be obtained from an accelerometer of PCD 330. Further, wireless communication subsystems of PCD 330 may collect wireless signal data, such as an access point identifier and signal strength data.

In the example illustrated in FIG. 3A, PCD 330 is mounted to measuring wheel device 320. Measuring wheel device 320 is walked within an area 380 by a user. In some instances, area 380 is an indoor environment without a location beacon system. A path 340 represents the walking path created by walking measuring wheel device 320 from a start location 310 to an end location 350. Measuring wheel device 320 determines distance data at any current location on the path 340. The distance data collected at locations, such as distance travelled by measuring wheel device 320 from start 310, represents the span of the path 340 from the start location 310 to the end location 350.

PCD 330, for example a Relay X device mounted on measuring wheel device 320, collects wireless signal data from wireless access points 300a-300n at each current location or point. The distance data and wireless signal data obtained by PCD 330 can be marked with a corresponding timestamp for the current location. By way of example, PCD 330 uses a data collection mode to collect the distance data from measuring wheel device 320 via a BLUETOOTH communication connection and collect wireless signal data. PCD 330 is configurable to upload or otherwise provide the collected environment dataset, for example to a server following the collection of all data between start location 310 and end location 350.

In some instances, path 340, start location 310, and end location 350 are intermediary values, where a new intermediary start location is located at a last respective intermediary end location, to allow the combining of each set of intermediary values into one extensive, complete path. This may be accomplished either via a programmatic method or via a manual method, as further described herein. Such a technique may be used, for example, in a large environment that requires more than one walking collection session.

In some instances, measuring wheel device 320 is moved within area 380 by another mechanism, for example PCD 330 or another handheld or mobile device may use step data as collected via an accelerometer, or a device such as a drone, robot, remote-controlled device, or other automated device may be utilized to collect at least part of the odometry data, such as distance data, or a similar technique may be employed. PCD 330 need not be connected to measuring wheel device 320 provided that PCD 330 is near the measuring wheel device at each respective distance where data is collected while creating the path 340.

Figure 3B:
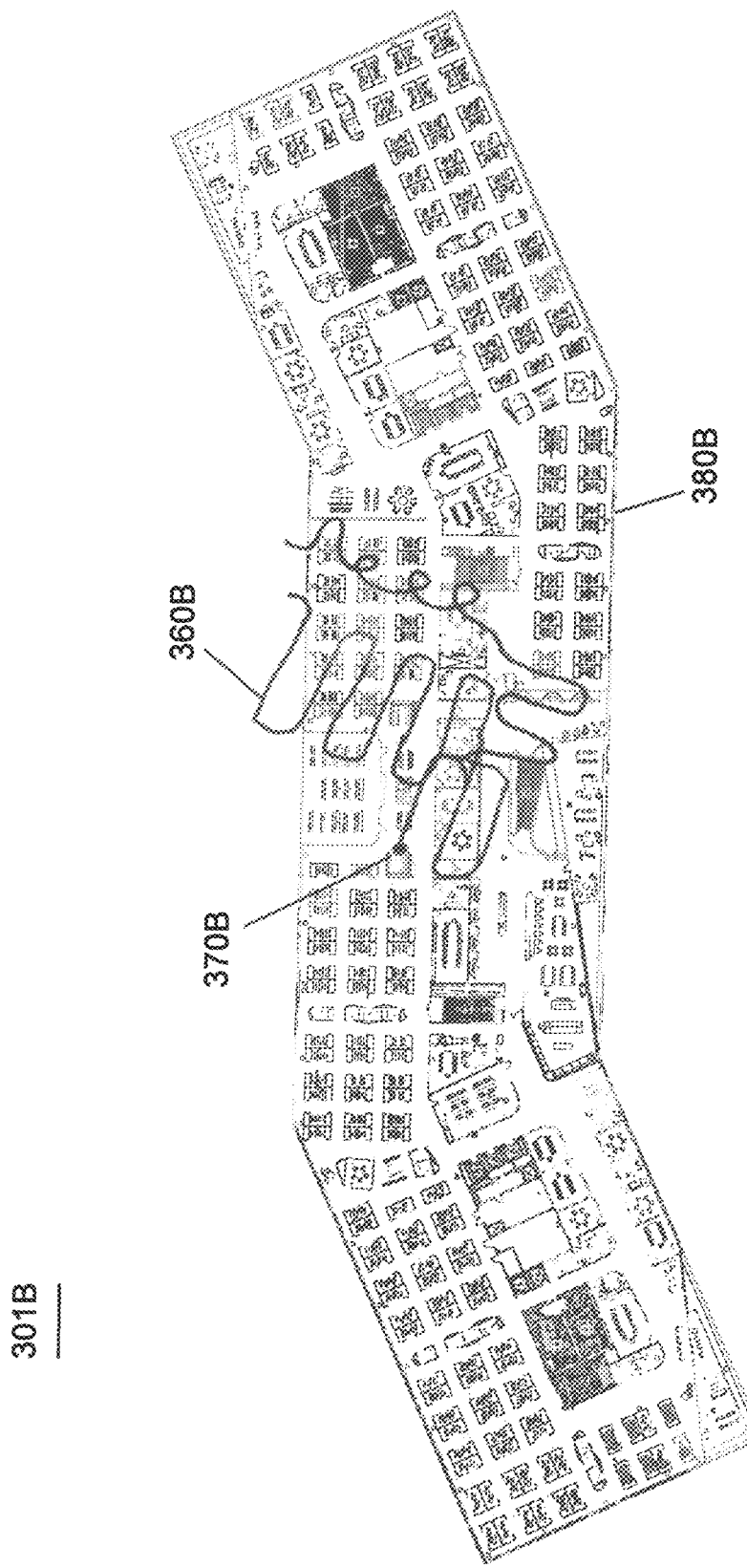
FIG. 3B illustrates an example interactive graphical user interface (GUI).

FIG. 3B illustrates a graphical user interface (GUI) 301B that displays an interactive view that may be used to manually fit odometry data to a real-world location, such as an indoor floor plan. In the example of FIG. 3B, GUI 301B displays at least part of the odometry data in the form of a generated initial path graphic 360 overlaid on a floor plan. In the example of FIG. 3B, initial path graphic 360 represents the obtained odometry data in the form of distance data and direction data, making the shape of the initial path graphic 360B. Initial path graphic 360B is not oriented correctly to the real-world location in the example of FIG. 3B. Instead, it is oriented at a first reference point 370B, for example the center point of the floor plan or some predetermined location. This is because, in an embodiment, there is not a predetermined or automated positioning of the distance and orientation data, which is relative to the movement of the collection device, to the floor plan. It is noted that associated wireless signal data may be included in odometry data and may be included in GUI 301B or otherwise used in gross or refined positioning of an initial or updated path, as further described herein.

In some instances, a user or automated process uploads the odometry data to a server for visualization onto a computer that provides GUI 301B. After the odometry data is received, an initial path graphic 360B is generated and displayed. In some instances, each respective distance represents distance intervals, where the distance data is collected at each interval. The distance intervals can be equivalent or similar intervals spanning between start location 310 and end location 350.

In FIG. 3B, initial path graphic 360B is represented on a map or graphic 380B comprising a floor plan. Graphic 380B comprises and displays real-world features of area 380 from which a walking path is formed. Graphic 380B can include items within the area 380, such as walls, doors and other large, stationary items. Initial path graphic 360B may be displayed as a line on the graphic 380B. In some instances, the relative location of initial path graphic 360 is generated in reference to a computer-generated first reference point 370B and can be located at the mathematical or geometric center of the graphic 380B for later manual adjustment using interactive GUI 301B, as further described herein.

In some cases, an automated positioning of initial path graphic 360B may be provided to fit it to the real-world environment represented by graphic 380B. For example, a SLAM (simultaneous localization and mapping) algorithm may be used for localizing distance and direction data collected with various points in graphic 380B. By way of specific example, an automated or semi-automated procedure may be used in which the distance and directional data may be positioned in the floor plan of graphic 380B using known real-world feature locations, e.g., wireless access point locations, permitting triangulation or some localization procedure to be used to provide an initial or updated fit of initial path graphic 360B in floor plan graphic 380B.

In some instances, initial path graphic 360B is displayed on a display device, where initial path graphic 360B is displayed as a plurality of relative distances alongside a plurality of respective wireless signal data collected at each distance point. In some other instances, the initial path is defined by a plurality of 2-dimensional shapes, such as circles, rectangles, or squares representing rooms or other areas, and displayed on a map of the area, arranged with an initial or refined fit adjusted using wireless signal or access point data, if known. In one example, the 2-dimensional shapes can resemble a chain of Venn diagrams, where each shape can represent a defined radius of the area and each defined radius is an intermediate area containing collected positional data between a start location and an end location. Each 2-dimensional shape can be plotted on the map in relation to the start location, allowing reference data for the respective areas such as rooms in a floor plan to be mapped to the shapes rather than a linear or line-based path.

Figure 3C:
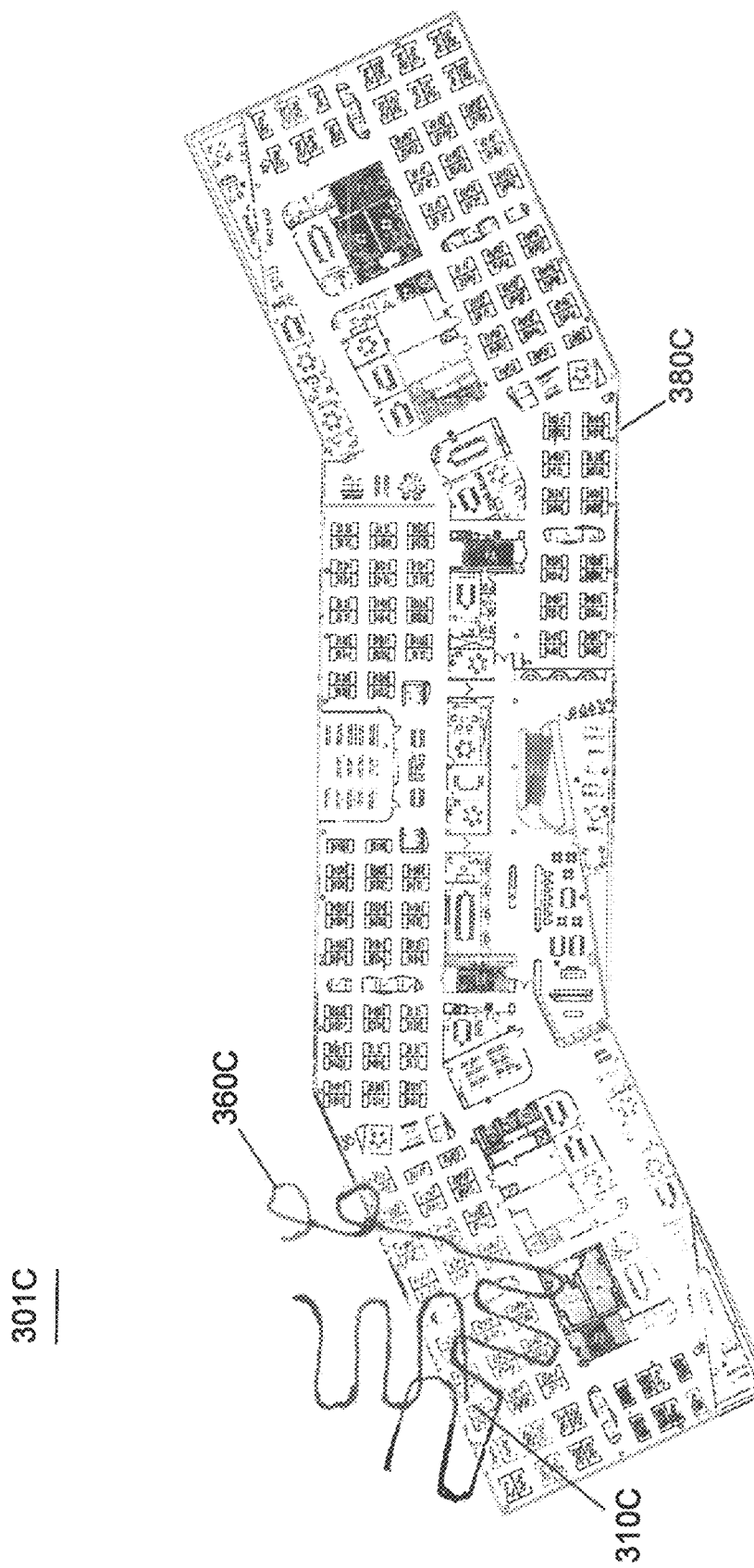
FIG. 3C illustrates an example interactive GUI.

FIG. 3C illustrates GUI 301C configured for manually receiving an adjustment to initial path graphic 360B via user input. In some instances, a user adjusts an initial path graphic 360B by adjusting the location of a first reference point, for example by manually selecting initial path graphic 360B at a known starting point 310C and positioning it to the actual start location 310 of the collection (as described in connection with FIG. 3A) represented in graphic 380C. The adjustment is then received and initial path graphic 360B is aligned to actual start location 310, displayed as an updated path graphic 360C.

FIG. 3D illustrates further results of manually adjusting and fitting to provide a further updated path graphic 390D in GUI 301D based on one or more manual adjustments. In some instances, further updated path graphic 390D is generated based on a received user input to change one or more points on graphic 360C to a new location. In addition to moving points, further updated path graphic 390D can be rotated and/or stretched to correct for misalignment.

Figure 3E:
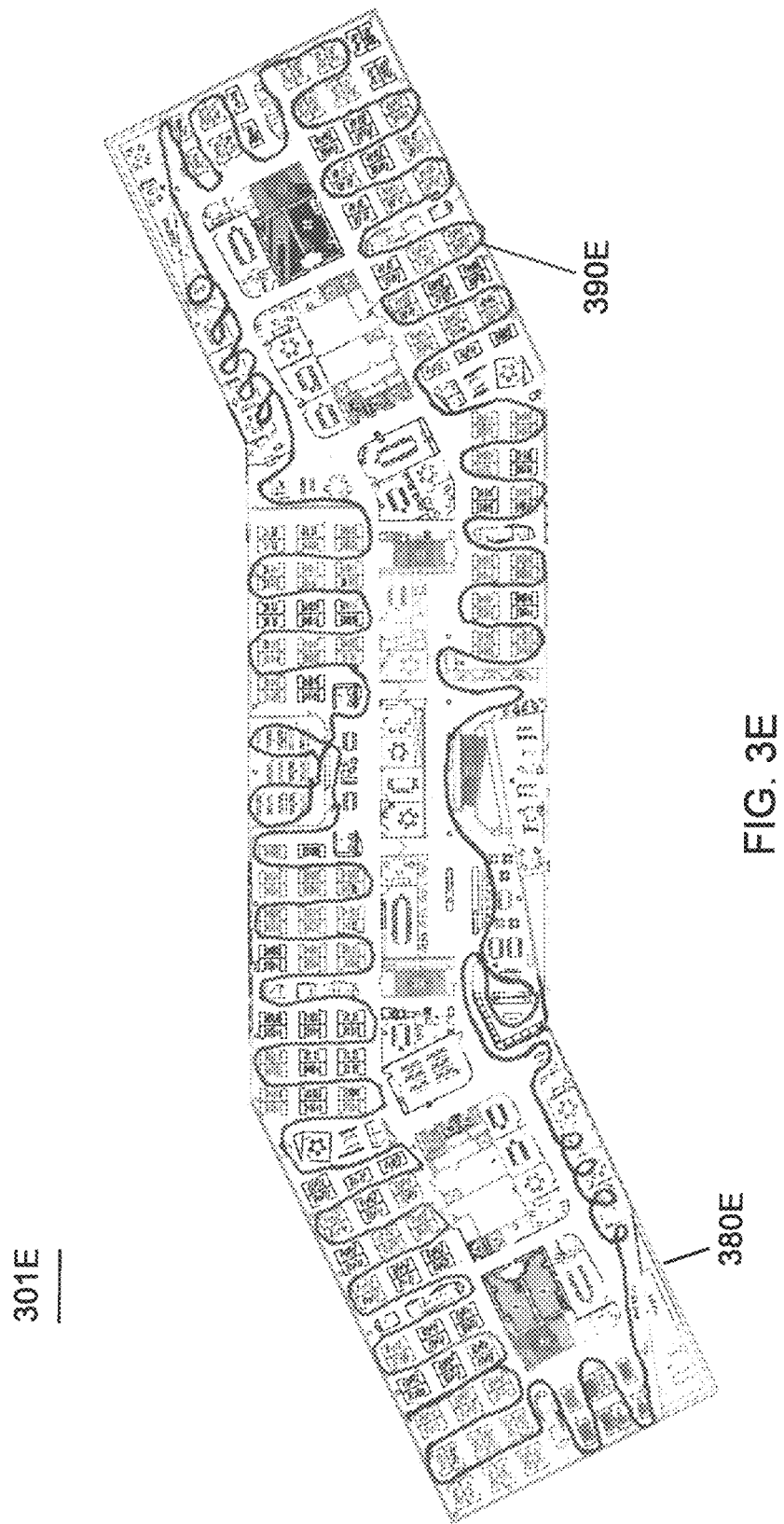
FIG. 3E illustrates an example interactive GUI.

In an embodiment, a process of continued adjustment or refining of initial path graphic 360B to fit real world graphic 380B may be provided, manually, semi-automatically, or automatically. In an example, shown in FIG. 3E, a final fitted path graphic 390E results and is displayed in GUI 301E on a display device. In some instances, final fitted path graphic 390E is represented on a graphic 380E for visual confirmation. For example, graphic 380E represents area 380 (referring to FIG. 3A) in which a walking path was used to collect odometry or wireless data. Graphic 380E displays walls, doors and other large, stationary items within area 380. Final fitted path graphic 390E is displayed in the example of FIG. 3E as a line. Final fitted path graphic 390E creates a fixed relationship between locations in the floor plan 380E and the collected real-world data from the wireless access points. The relationships can be used in the form of environment dataset to be used in for determining a location, as further described herein.

In some instances, final fitted path graphic 390E is displayed on a display device, where final fitted path graphic 390E is displayed as a plurality of relative distances alongside the plurality of respective wireless signal data collected at each distance point. In some other instances, final fitted path graphic 390E is defined by a plurality of 2-dimensional shapes and displayed on a map of the area. The 2-dimensional shapes can resemble a chain of Venn diagrams. Each shape can represent a defined radius of the area, wherein each defined radius is an intermediate area containing collected positional data between a start location and an end location. Each 2-dimensional shape can be plotted on the map in relation to the start location.

In some embodiments, a second set of odometry data is obtained for the same area as the first initial path, for example, to collect additional reference data at a different time. This may be required because the access point signals may interfere differently according to who is present in the environment, or which machinery is active. Further adjustments can be made based on the second set of odometry data, such as creating an average of the two. In other examples, adjustments can include updating the fixed relationships, updating the path used per unit time, manually inputting a piece of positional data distinct from the positional data originally included in the initial path, etc.

Figure 4:
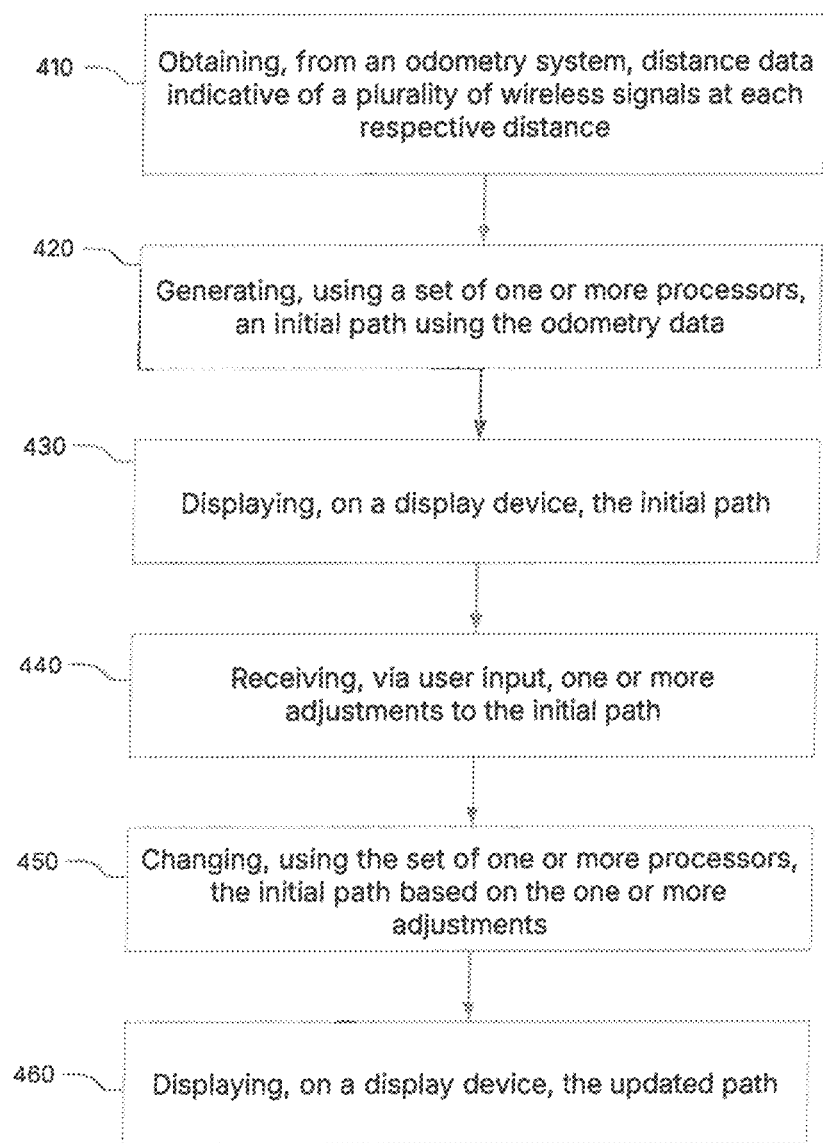
FIG. 4 illustrates an example method according to an embodiment.

Accordingly, embodiments provide methods of obtaining and refining or updating odometry data that embodies a known relationship between a location and expected wireless signal data that would be measured at that location. Referring now to FIG. 4, a method of collecting odometry data used for a location determination system is shown according to one embodiment. In step 410, odometry data is obtained from an odometry system, where the odometry data comprises distance data indicative of a plurality of wireless signals at each respective distance. In step 420, an initial path is generated by one or more processors using the odometry data. In step 430, the initial path generated in step 420 is displayed on a display device, for example provided in an interactive GUI as described herein. In step 440, one or more adjustments are received. The one or more adjustments may represent one or more changes to the initial path made by a user input, a semi-automated process, or a fully automated process such as via application of a SLAM algorithm. In some embodiments, a combination of techniques may be used, e.g., an initial positioning using a SLAM technique followed by manual refinement, if any.

In step 450, the initial path is changed to an updated path, where the updated path includes the adjustments to the initial path received in step 440. The changes in step 450 are made based on the one or more adjustments using the set of one or more processors. In step 460, the updated path generated in step 450 is displayed, where displaying the updated path in step 460 can occur on a display device.

In an embodiment, the obtaining 410 comprises obtaining the distance data from a dedicated hardware device. For example, measuring wheel device 320 in combination with PCD 330 may be utilized. As described, other dedicated hardware may be utilized, for example a drone or robot. In the example of use of measuring wheel device 320, a method may include traversing an environment with measuring wheel device 320.

In an embodiment, the generating 420 of the initial path comprises integrating the positional data with the distance data over time to form a two-dimensional path graphic based on relative position data computed from the odometry data. For example, respective points of a line graphic for a path may be based on the odometry data obtained from the odometry system during the collection phase.

As described herein, the receiving at 440 may include receiving manual adjustments from a user and therefore a method may include displaying, on the display device, one or more interactive elements associated with the initial path graphic to facilitate the receiving at 440. For example, the receiving at 440 may include receiving the adjustments via the one or more interactive elements. In one example, the one or more interactive elements are positioned at one or more points of the initial path graphic. By way of specific example, the one or more interactive elements may be positioned at an end point of the initial path. Further, interactive elements such as handles or visual cues may be provided on the initial, updated or adjusted path graphic such that a user may drag, scale or rotate the path graphic to a desired location within a GUI. The process outlined in FIG. 4, or parts thereof, may be iterated to fit the path.

An embodiment then forms a dataset comprising the refined positional data in combination with the wireless signal data for numerous points along the path. As described herein, these two data types are related via a unique indicator, for example a timestamp. The output dataset resulting from this refinement process may be used to form a ground truth for a location determination process based on received wireless signal data.

As an example of a location determination process, a PCD, e.g., PCD 330, may utilize the refined position data by looking for a match to the wireless data received at a point in the environment. By utilizing the match, along with prior location results, an accurate estimate of the location of the point on the environment can be made. In some embodiments, the matching may be performed on PCD 330. This allows a PCD to reduce power consumption during location determination by eliminating the need to communicate with external devices, such as a cloud server and by eliminating the need to continuously scan for a beacon. Providing an accurate estimate of location for any point in the environment allows the PCD 330 to defer any location determination until required, thus saving significant power.

Figure 5:
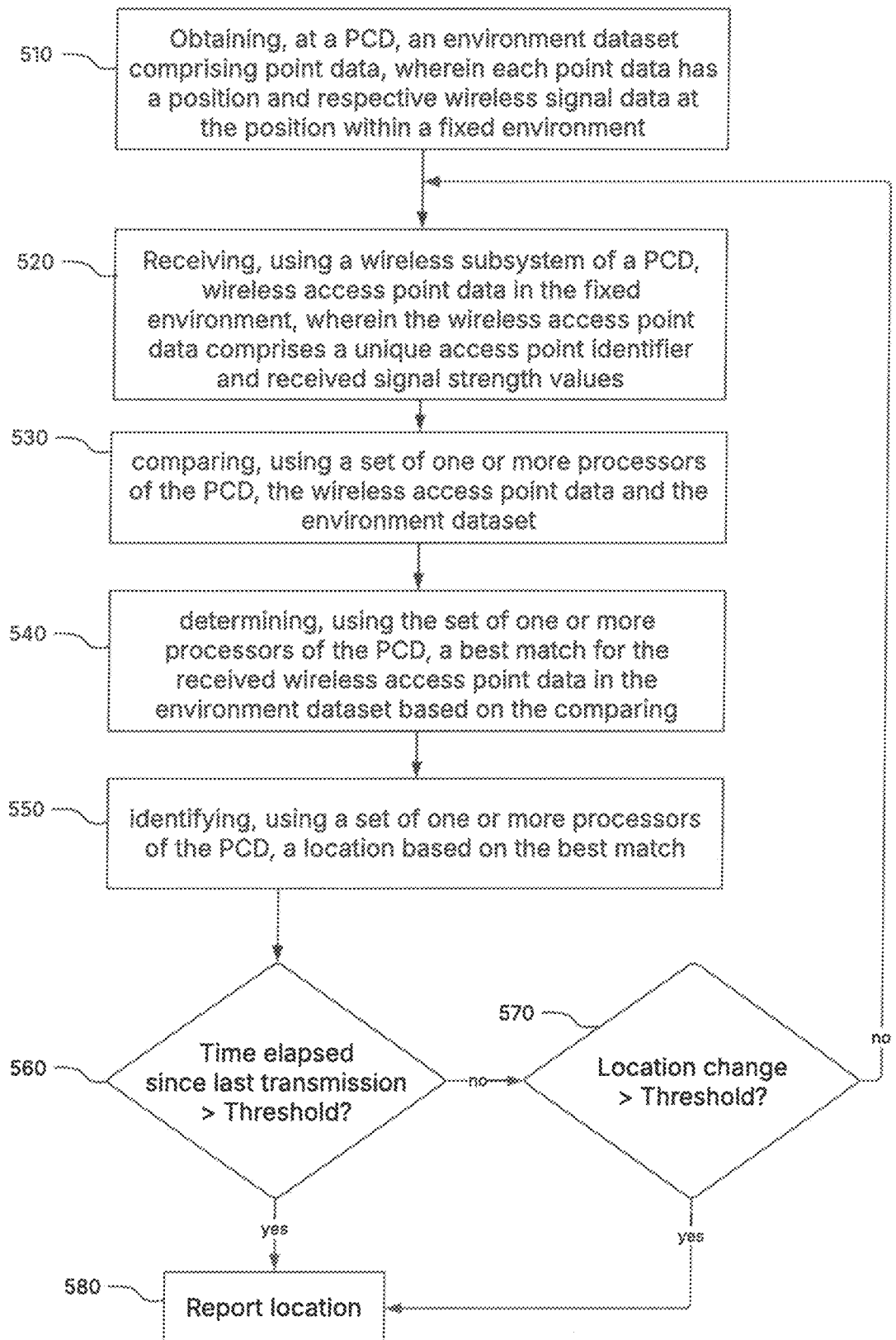
FIG. 5 illustrates an example method according to an embodiment.

Referring to FIG. 5, an embodiment provides for a PCD performing a location determination. In the example of FIG. 5, a PCD obtains a precomputed environment dataset comprising point data, e.g., from a remote server, indicated at 510. In an embodiment, each point data has a position and respective wireless signal data at the position within a fixed environment, e.g., for points along a path of an indoor environment. As may be appreciated, the remote server may be wirelessly connected to the PCD to provide the dataset. Additionally, or alternatively, the remote server may take the form of a device physically coupled to the PCD to provide the dataset. That is, a remote server may take a variety of forms so long as the PCD receives the precomputed environment dataset for use locally.

In an embodiment, the location determination process includes receiving, using a wireless subsystem of a PCD, wireless access point data comprising a plurality of wireless signal identifiers and associated signal strength values, indicated at 520. For example, the PCD obtains the Basic Service Set Identifier (BSSID) and Received Signal Strength Indicator (RSSI) of one or more access points at the location of the PCD.

In an embodiment, the location determination method includes comparing, using a set of one or more processors of the PCD, the wireless access point data, e.g., the wireless signal identifiers and associated signal strength values, with the precomputed environment dataset, indicated at 530. One example of a comparison technique is a ranking method, such as Kendall's Rank Correlation Coefficient or Kendall's Tau. The highest positive rank indicates the most likely location and may be reported as the current location. It will be noted that other comparison techniques may be used to find the best match using a local compute resource on the PCD. An embodiment thus includes determining, using the set of one or more processors of the PCD, a best match for the received wireless access point data in the environment dataset based on the comparing, indicated at 540.

Following the comparing and determining of 530 and 540, respectively, an embodiment includes identifying, using a set of one or more processors of the PCD, a location based on the matching of the wireless signal identifiers and associated signal strength values with the precomputed environment dataset, indicated at 550. The identified location may be used by other software processes running on the PCD or, on request, sent to a remote server.

In an embodiment, to maximize battery life on the PCD, the current location is not continually computed, but is computed on demand, for example by another software process running on the PCD. Further, the current location does not have to be reported back to the server each time it is determined which requires significant power. Further, since the location does not vary rapidly, other techniques such as compressing differences from a prior location may be used to reduce wireless payload.

In an embodiment, a method may include transmitting, from the PCD to the remote server, the location identified, indicated at 580. For example, in an embodiment a method includes determining, by the set of one or more processors of the PCD, that the location identified has changed a predetermined amount, for example with respect to time 560 or location 570, from a prior location determined for the PCD, and thereafter transmitting, from the PCD to the remote server, the location identified as indicated at 580. In an embodiment, the prior location is received by the PCD from a remote server, e.g., PCS 100.

In an embodiment, the obtaining indicated at 510 includes performing some collection and preparation or precomputing of reference wireless data, for example sorting, into a predetermined number of bins, values representative of respective wireless signal identifiers of the wireless data. A representative value may be, for example, a hash formed from a wireless identifier, e.g., BSSID. Thus, the wireless data for a point along a path may be compressed into a representation that is sorted into a smaller data set of organized bins, e.g., a number of bins such as 32 or 64 bins. Thus, a reduced set of data may be stored as representative for a bin, e.g., the highest RSSI value for the bin.

In an embodiment, reducing the size of the environment dataset in a table, such as through binning, allows some precomputation of likely location that can facilitate rank-based location determinations more efficiently. For example, in an embodiment the method includes generating a comparison value computed by comparing the representative value of each bin, e.g., a strongest RSSI value, with that of remaining bins. Hence, data such as point A on a path is associated with bin 1, with bin 1 being represented by a strongest RSSI value from wireless access point ABC. The comparison with another bin, e.g., bin 2, may be data indicating that wireless access point ABC has a higher RSSI value in bin 1 than in the data of bin 2. Such precomputed comparisons may be referred to as intermediate data or information.

In an embodiment, the obtaining indicated at 510 includes storing the comparison value as intermediate data of the precomputed environment dataset. In one example, an embodiment permits computing, for the wireless access point data collected at a location, corresponding intermediate data, where the determining the best matching in the precomputed environment dataset comprises comparing the intermediate data and corresponding intermediate data from the stored environment dataset.

Figure 6:
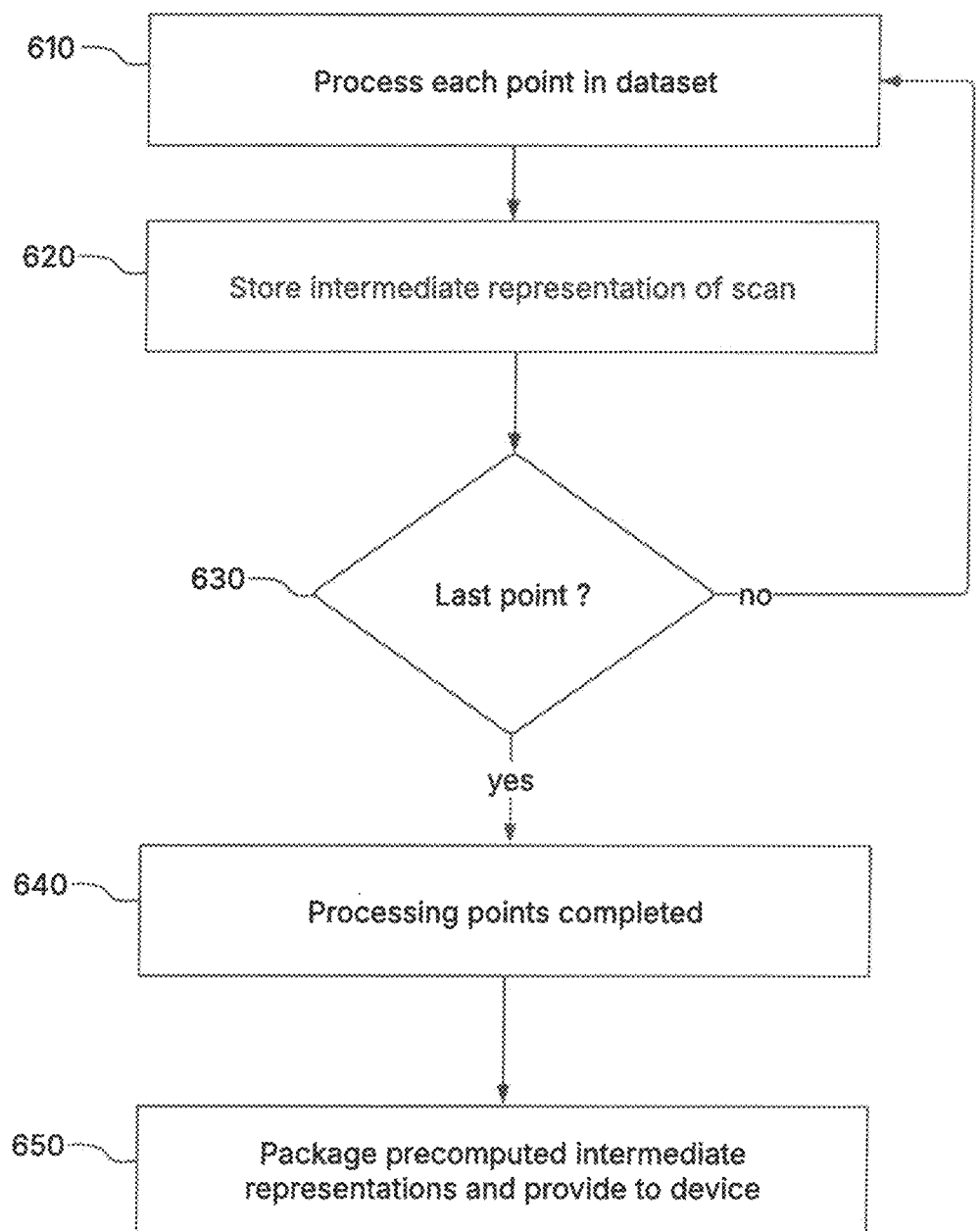
FIG. 6 illustrates an example method according to an embodiment.

By way of example and referring to FIG. 6, in an embodiment the generation of a precomputed intermediate data derived from a plurality of wireless data obtained during a traversal of an indoor environment includes the following steps. Processing is applied to each point in the dataset, as indicated at 610. The processing indicated at 610 may include quantizing and sorting the wireless access point data into a table of predetermined size. In an embodiment, the sorting comprises identifying, for each of a predetermined number of table rows, a representative value of a wireless signal identifier having the greatest received signal strength. In an embodiment, processing includes generating a comparison value computed by comparing a representative value of each table row with the remaining table rows. The comparison value may be stored as intermediate data of the environment dataset.

An embodiment therefore stores, for each point in the plurality of wireless data values, starting with the RSSI value for each wireless access point, an intermediate data representation of the point, as indicated at 620. The technique and format of the intermediate data representation may vary based on the mechanism employed to perform the comparing, determining, and identifying represented in FIG. 5 at 530, 540, and 550, respectively. In other words, the formation and format of the intermediate data representation may depend on the positioning technique used. For an approach using a ranking, such as an approximation to Kendall's Tau, each BSSID value can be hashed and sorted into bins (e.g., based on a modulo function), storing on the largest RSSI value in each bin. The intermediate data is generated from the binned RSSI information and stored in a database, e.g., one or more bits of data indicative of the strongest representative BSSID value and its relation to that of other bins.

As illustrated in FIG. 6, a method may include determining if any more wireless data points are to be processed, indicated at 630, and if so, continuing the process of precomputing a compressed or simplified form of data until processing is complete, indicated at 640. Otherwise, the process may continue. The database of intermediate representations of the observed RSSIs at each point in the path traversed may then be provided to, e.g., loaded on to, the PCD, as indicated at 650. When a position determination is requested, for example by a software process running on the PCD, the PCD calculates the position based on the precomputed intermediate representations.

Figure 7:
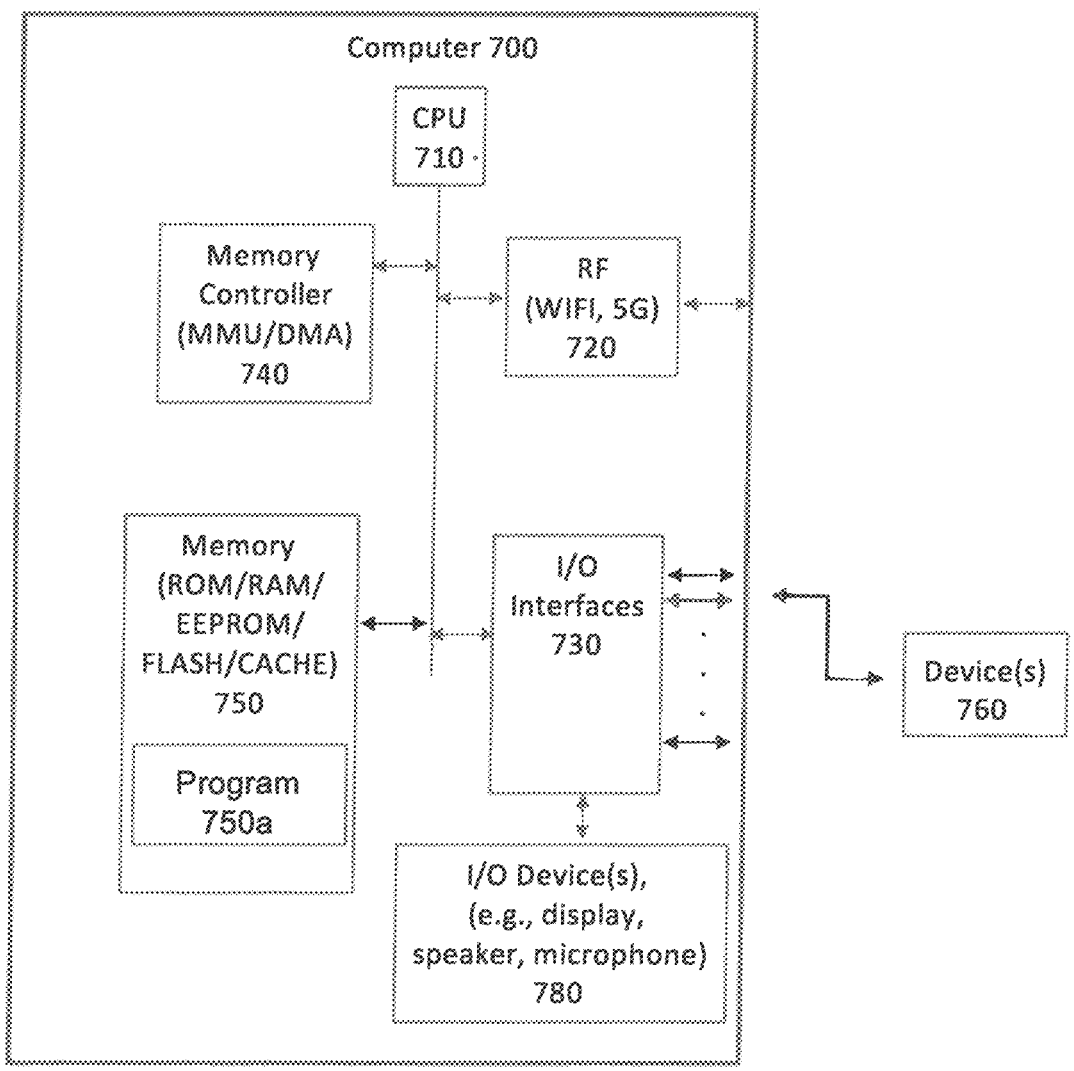
FIG. 7 illustrates an example system and components according to an embodiment.

Referring to FIG. 7, it will be readily understood that certain embodiments can be implemented using any of a wide variety of devices or combinations of devices and components. In FIG. 7 an example of a computer 700 and its components are illustrated, which may be used in a device such as CPS 100 or PCDs 160*a*-160*f* for implementing certain of the functions or acts described herein, e.g., in association with FIG. 4, FIG. 5 and FIG. 6, embodied in program 750*a*, in turn implementing acts or subsets thereof.

Also, circuitry other than that illustrated in FIG. 7 may be utilized in one or more embodiments. The example of FIG. 7 includes certain functional blocks, as illustrated, which may be integrated onto a single semiconductor chip to meet specific application requirements.

One or more processing units are provided, which may include a central processing unit (CPU) 710, one or more graphics processing units (GPUs), and/or micro-processing units (MPUs), which include an arithmetic logic unit (ALU) that performs arithmetic and logic operations, instruction decoder that decodes instructions and provides information to a timing and control unit, as well as registers for temporary data storage. CPU 710 may comprise a single integrated circuit comprising several units, the design and arrangement of which vary according to the architecture chosen.

Computer 700 also includes a memory controller 740, e.g., comprising a direct memory access (DMA) controller to transfer data between memory 750 and hardware peripherals. Memory controller 740 includes a memory management unit (MMU) that functions to handle cache control, memory protection, and virtual memory. Computer 700 may include controllers for communication using various communication protocols (e.g., I$^2$C, USB, etc.).

Memory 750 may include a variety of memory types, volatile and nonvolatile, e.g., read only memory (ROM), random access memory (RAM), electrically erasable programmable read only memory (EEPROM), Flash memory, and cache memory. Memory 750 may include embedded programs, code, and software, e.g., program 750*a*, that provides coded methods such as illustrated and described in connection with FIGS. 4-6 or provides GUIs as for example illustrated in FIG. 3B-FIG. 3E. By way of example, and not limitation, memory 750 may also include an operating system, application programs, other program modules, code, and program data, which may be downloaded, updated, or modified via remote devices.

A system bus permits communication between various components of the computer 700. I/O interfaces 730 and radio frequency (RF) devices 720, e.g., Wi-Fi and telecommunication radios, near field communication modules, etc., may be included to permit computer 700 to send data to and receive data from remote devices using wireless mechanisms, noting that data exchange interfaces for wired data exchange may be utilized. Computer 700 may operate in a networked or distributed environment using logical connections to one or more other remote computers or devices 760, for example in a system comprising a CPS or a set of PCDs. The logical connections may include a network, such local area network (LAN) or a wide area network (WAN) but may also include other networks/buses. For example, computer 700 may communicate data with and between device(s) 760.

Computer 700 may therefore execute program instructions or code configured to provide CPS and/or PCD functionality and perform other functionality of the embodiments. A user can interface with (for example, enter commands and information) the computer 700 through input devices, which may be connected to I/O interfaces 730. A display or other type of I/O device 780 may be connected to or integrated with the computer 700, for example via an interface selected from I/O interfaces 730.

It should be noted that the various functions described herein may be implemented using instructions or code stored on a memory, e.g., memory 750, that are transmitted to and executed by a processor, e.g., CPU 710. Computer 700 includes one or more storage devices that persistently store programs and other data. A storage device or computer readable medium, as used herein, is a non-transitory computer readable medium. Some examples of a non-transitory computer readable medium include, but are not limited to, storage integral to computer 700, such as memory 750, a hard disk or a solid-state drive, and removable storage, such as an optical disc or a memory stick.

Program code stored in a memory or storage device may be transmitted using any appropriate transmission medium, including but not limited to wireless, wireline, optical fiber cable, RF, or any suitable combination of the foregoing.

Program code for carrying out operations according to various embodiments may be written in any combination of one or more programming languages. The program code may execute entirely on a single device, partly on a single device, as a stand-alone software package, partly on single device and partly on another device, or entirely on the other device. In an embodiment, program code may be stored in a non-transitory medium and executed by a processor to implement functions or acts specified herein. In some cases, the devices referenced herein may be connected through any type of connection or network, including a local area network (LAN) or a wide area network (WAN), or the connection may be made through other devices (for example, through the Internet using an Internet Service Provider), through wireless connections using a mobile network, or through a hard wire connection, such as over a USB connection.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" or "the" preceding an element does not exclude the presence of a plurality of such elements. The mere fact that certain elements are recited in mutually different dependent claims does not indicate that these elements cannot be used in combination. The word "about" or similar relative term as applied to numbers includes ordinary (conventional) rounding of the number with a fixed base such as 5 or 10.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized or omitted as appropriate, as the explicit illustrated examples are used only for descriptive purposes and are not to be construed as limiting.

As used herein, the statement that two or more parts or components are "coupled" shall mean that the parts are joined or operate together either directly or indirectly, e.g., through one or more intermediate parts or components, so long as a link occurs. As used herein, "operatively coupled" means that two or more elements are coupled to operate together or are in communication, unidirectional or bidirectional, with one another. As used herein, the term "number" shall mean one or an integer greater than one (i.e., a plurality). As used herein a "set" shall mean one or more.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method, comprising:
   receiving, using a wireless subsystem of a portable communication device (PCD), wireless access point data from one or more wireless access points in a fixed environment, wherein the wireless access point data comprises a unique access point identifier and received signal strength values;
   obtaining, at the PCD, an environment dataset comprising point data, wherein each point data has a position and respective wireless signal data at that position within the fixed environment, the obtaining comprising quantizing and sorting the wireless access point data into a table of predetermined size, the sorting comprising identifying, for each table row, a representative value of a wireless signal identifier having the greatest received signal strength;
   comparing, using a set of one or more processors of the PCD, the wireless access point data and the environment dataset;
   determining, using the set of one or more processors of the PCD, a best match for the received wireless access point data in the environment dataset based on the comparing;
   identifying, using a set of one or more processors of the PCD, a location based on the best match; and
   generating a comparison value computed by comparing the representative value of each table row with respective representative values of remaining table rows.

2. The method of claim 1, comprising transmitting, from the PCD to a remote server, the location identified.

3. The method of claim 1, comprising determining, by the set of one or more processors of the PCD, a difference in location identified for the PCD based on a prior location.

4. The method of claim 3 comprising transmitting, from the PCD to the remote server, the difference.

5. The method of claim 4, wherein the transmitting is based on the difference in location exceeding a predetermined amount.

6. The method of claim 3, wherein the prior location is received by the PCD from the remote server.

7. The method of claim 1, wherein the obtaining comprises collecting the wireless access point data from a traversal of the fixed environment.

8. The method of claim 1, comprising storing the comparison value as intermediate data of the environment dataset.

9. The method of claim 8, wherein the determining a best match for the received wireless access point data is based on the stored intermediate data.

10. A portable communication device (PCD), comprising:
    a set of one or more processors; and
    a non-transitory storage device comprising code executable by the set of one or more processors, the code comprising:
       code that receives, using a wireless subsystem of a portable communication device (PCD), wireless access point data from one or more wireless access points in a fixed environment, wherein the wireless access point data comprises a unique access point identifier and received signal strength values;
       code that obtains, at the PCD, an environment dataset comprising point data, wherein each point data has a position and respective wireless signal data at that position within the fixed environment, the obtaining comprising quantizing and sorting the wireless access point data into a table of predetermined size, the sorting comprising identifying, for each table row, a representative value of a wireless signal identifier having the greatest received signal strength;

code that compares, using a set of one or more processors of the PCD, the wireless access point data and the environment dataset;

code that determines, using the set of one or more processors of the PCD, a best match for the received wireless access point data in the environment dataset based on the comparing;

code that identifies, using a set of one or more processors of the PCD, a location based on the best match; and code that generates a comparison value computed by comparing the representative value of each table row with respective representative values of remaining table rows.

11. The system of claim 10, comprising code executable by the set of one or more processors to determine a difference in location identified for the PCD based on a prior location.

12. The system of claim 11 code executable by the set of one or more processors to transmit, from the PCD to the remote server, the difference.

13. The system of claim 12, wherein the difference is transmitted based on the difference exceeding a predetermined amount.

14. A computer program product, comprising:
a non-transitory computer readable storage medium having computer executable code, comprising:
code that receives, using a wireless subsystem of a portable communication device (PCD), wireless access point data from one or more wireless access points in a fixed environment, wherein the wireless access point data comprises a unique access point identifier and received signal strength values;

code that obtains, at the PCD, an environment dataset comprising point data, wherein each point data has a position and respective wireless signal data at that position within the fixed environment, the obtaining comprising quantizing and sorting the wireless access point data into a table of predetermined size, the sorting comprising identifying, for each table row, a representative value of a wireless signal identifier having the greatest received signal strength;

code that compares, using a set of one or more processors of the PCD, the wireless access point data and the environment dataset;

code that determines, using the set of one or more processors of the PCD, a best match for the received wireless access point data in the environment dataset based on the comparing;

code that identifies, using a set of one or more processors of the PCD, a location based on the best match; and code that generates a comparison value computed by comparing the representative value of each table row with respective representative values of remaining table rows.

15. The computer program product of claim 14, further comprising code to determine a difference in location identified for the PCD based on a prior location.

16. The computer program product of claim 15 further comprising code to transmit, from the PCD to the remote server, the difference.

17. The computer program product of claim 16, wherein the difference is transmitted based on the difference exceeding a predetermined amount.

* * * * *